United States Patent [19]
LeGall et al.

[11] Patent Number: 6,081,263
[45] Date of Patent: *Jun. 27, 2000

[54] SYSTEM AND METHOD OF A USER CONFIGURABLE DISPLAY OF INFORMATION RESOURCES

[75] Inventors: Loretta C. LeGall, Los Altos; Hans Masli, San Jose; Chuen-Chien Lee, Fremont; Koichi Goto, San Diego, all of Calif.

[73] Assignees: Sony Corporation, Tokyo, Japan; Sony Electronics, Inc., Park Ridge, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/957,269

[22] Filed: Oct. 23, 1997

[51] Int. Cl.[7] .......................................................... G06F 3/14
[52] U.S. Cl. .......................... 345/327; 345/333; 345/334; 345/357; 345/328; 707/513; 707/501; 709/202; 709/203
[58] Field of Search ...................................... 345/357, 356, 345/327, 328, 333, 334, 335; 707/501, 513, 4; 395/200.32, 200.33, 200.47, 200.49

[56] References Cited

U.S. PATENT DOCUMENTS

| | | | |
|---|---|---|---|
| 5,585,838 | 12/1996 | Lawler et al. | 345/327 |
| 5,589,892 | 12/1996 | Knee et al. | 348/731 |
| 5,625,781 | 4/1997 | Cline et al. | 345/335 |
| 5,671,411 | 9/1997 | Watts et al. | 707/4 |
| 5,675,752 | 10/1997 | Scott et al. | 345/333 |
| 5,708,826 | 1/1998 | Ikeda et al. | 345/334 |
| 5,778,181 | 7/1998 | Hidary et al. | 395/200.48 |
| 5,801,702 | 9/1998 | Dolan et al. | 395/200.3 |
| 5,832,496 | 11/1998 | Anand et al. | 345/335 |
| 5,870,746 | 2/1999 | Knutson et al. | 707/101 |
| 5,901,286 | 5/1999 | Danknick et al. | 709/203 |
| 5,930,768 | 7/1999 | Hooban | 345/326 |

*Primary Examiner*—Raymond J. Bayerl
*Assistant Examiner*—Thomas T. Nguyen
*Attorney, Agent, or Firm*—Blakely, Sokoloff, Taylor & Zafman LLP

[57] ABSTRACT

A method and apparatus for creating user configurable interactive display, wherein a control area is invoked in order to display representations of at least one operating environment. The operating environment contains user interactive components corresponding to information resources which may be selected for use by the user. A scratch pad is invoked onto the display allowing a user to select components from the operating environment to be placed onto the scratch pad. Once the interactive components from one or more operating environments are placed onto the scratch pad, a user interactive display area is generated comprising a display of user selected components.

23 Claims, 12 Drawing Sheets

```
<HTML>
<HEAD>
<TITLE>DssPc Demo 1997</TITLE>  ==> TITLE
</HEAD>
<BODY>
<P ALIGN=CENTER><FONT FACE="ARIAL" SIZE=7><B>DssPC Demo 1997</B></P>  } FONT
<FONT SIZE=3>

<OBJECT ID="Epg1" WIDTH=500 HEIGHT=400
       CLASSID="CLSID:7E2593E4-6FB5-11D0-B313-444553540000">
            <PARAM NAME="_Version" VALUE="65536">
900         <PARAM NAME="_ExtentX" VALUE="13229">
            <PARAM NAME="_ExtentY" VALUE="10583">
            <PARAM NAME="_StockProps" VALUE="0">
    </OBJECT>
```
} EPG OBJECT + CHANNEL OBJECT

```
    <OBJECT ID="AdsRotator1" WIDTH=100 HEIGHT=51
       CLASSID="CLSID:4AA08F43-409B-11D1-904E-00A024BB6BFB">
            <PARAM NAME="_Version" VALUE="65536">
            <PARAM NAME="_ExtentX" VALUE="2646">
            <PARAM NAME="_ExtentY" VALUE="1323">
            <PARAM NAME="_StockProps" VALUE="0">
    </OBJECT>
```
} ADDS OBJECT

```
    <OBJECT ID="TickerCtl1" WIDTH=300 HEIGHT=25
       CLASSID="CLSID:5AABE530-DAF0-11CD-8445-00AA00339710">
            <PARAM NAME="_Version" VALUE="65536">
            <PARAM NAME="_ExtentX" VALUE="7938">
            <PARAM NAME="_ExtentY" VALUE="661">
            <PARAM NAME="_StockProps" VALUE="84">
            <PARAM NAME="Text" VALUE="Sony Electronics, Inc.
Expecting data . . . . ">
    </OBJECT>
```
} TICKER OBJECT

WEB OBJECT

```
    <P ALIGN=LEFT><A HREF="http://www.cyberdiet.com/"> <IMG SRC=\dsspc\powere
905 d.gif"WIDTH=100 HEIGHT=46 ALIGN=LEFT ALT=""> Eatright@Cyberdiet.com - Cybe
    rdiet's Home Page </A>
    <BR CLEAR=LEFT>
    <P ALIGN=CENTER> <A HREF="http://www.sjmercury.com/gmsv/"> <FONT FACE=Ari
    al" SIZE=5> <I> Good Morning Silicon Valley </I></FONT> </A>
    <P ALIGN=LEFT><FONT FACE="Arial" SIZE=5> <I> This is my Favorite Page - c
    reated using DssPc Tool. </I></FONT>
    <P ALIGN=LEFT><A HREF="http://www.msn.com/default.asp"> <IMG SRC="C:\proto
    1296v2\Html\msn.gif" WIDTH=100 HEIGHT=46 ALIGN=LEFT ALT=""> Welcom to MSN.
    COM</A>
    <BR CLEAR=LEFT>
```

WEB OBJECT

```
    <OBJECT ID="BpcAV1" WIDTH=400 HEIGHT=300
       CLASSID="CLSID:DDF90183-9BD4-11D0-8DD2-00A024837269">
            <PARAM NAME="_Version" VALUE="65536">
            <PARAM NAME="_ExtentX" VALUE="10583">
            <PARAM NAME="_ExtentY" VALUE="7938">
            <PARAM NAME="_StockProps" VALUE="0">
    </OBJECT>
```
} A/V OBJECT

```
</BODY>
</HTML>
```

FIG. 9

SYSTEM AND METHOD OF A USER CONFIGURABLE DISPLAY OF INFORMATION RESOURCES

BACKGROUND OF THE INVENTION

1. Field of the Invention

The present invention relates to the field of user interfaces on computer systems. More particularly, the present invention relates to a system which enables the user to define multimedia and internet environments on the desktop.

2. Art Background

Computer technology has advanced to the point that the user has been provided with a seemingly endless stream of information. The Internet is one example of a resource that enables a user to access large amounts of information. In addition, it is quite common to provide audio/video on a computer. However, to some users, this information may be somewhat overwhelming, as it is not readily apparent how to organize all this information. In the simplest sense, such users will simply access the desired media, e.g. Internet, and when he is finished with the access, he will access another type of media. This is quite cumbersome and not efficient. It is therefore desirable to provide a system to enable the user to configure the "user's world" of information resources and enable a user to access those information resources easily and intuitively.

SUMMARY OF THE INVENTION

The present invention provides a user with the tools to define the display and organization of information from a variety of information sources. In one embodiment, a set of tools and a scratch pad is provided to the user. Using the tools, the user can select items to drag onto the scratch pad. For example, the user can select web sites and drag particular web sites onto the scratch pad. Alternately, an electronic program guide (EPG) can be created on the scratch pad; the EPG typically consists of user selected channels. Once the user has placed the items of interest onto the scratch pad, the system generates an HTML frame based upon the resources selected by the user. The user can further specify the update frequency of information on the display. For example, the electronic program guide can be updated every half hour. In addition, it is preferred that the display space includes an audio and video window for the displaying of audio/video broadcasts acquired from regular broadcast cable or satellite transmissions. Thus even a new user can configure a "world", specifically tailored to the user's interests.

BRIEF DESCRIPTION OF THE DRAWINGS

The objects, features and advantages of the present invention will be apparent to one of skill in the art from the following detailed description, in which:

FIG. 9 is an illustration of one HTML file containing user selected objects in accordance with the teachings of the present invention.

DETAILED DESCRIPTION

In the following description for purposes of explanation, numerous details are set forth in order to provide a thorough understanding of the present invention; however, it will be apparent to one skilled in the art that these specific details are not required in order to practice the present invention. In other instances, well known electrical structures and circuits are shown in block diagram in order not to obscure the present invention unnecessarily.

Figure 1:
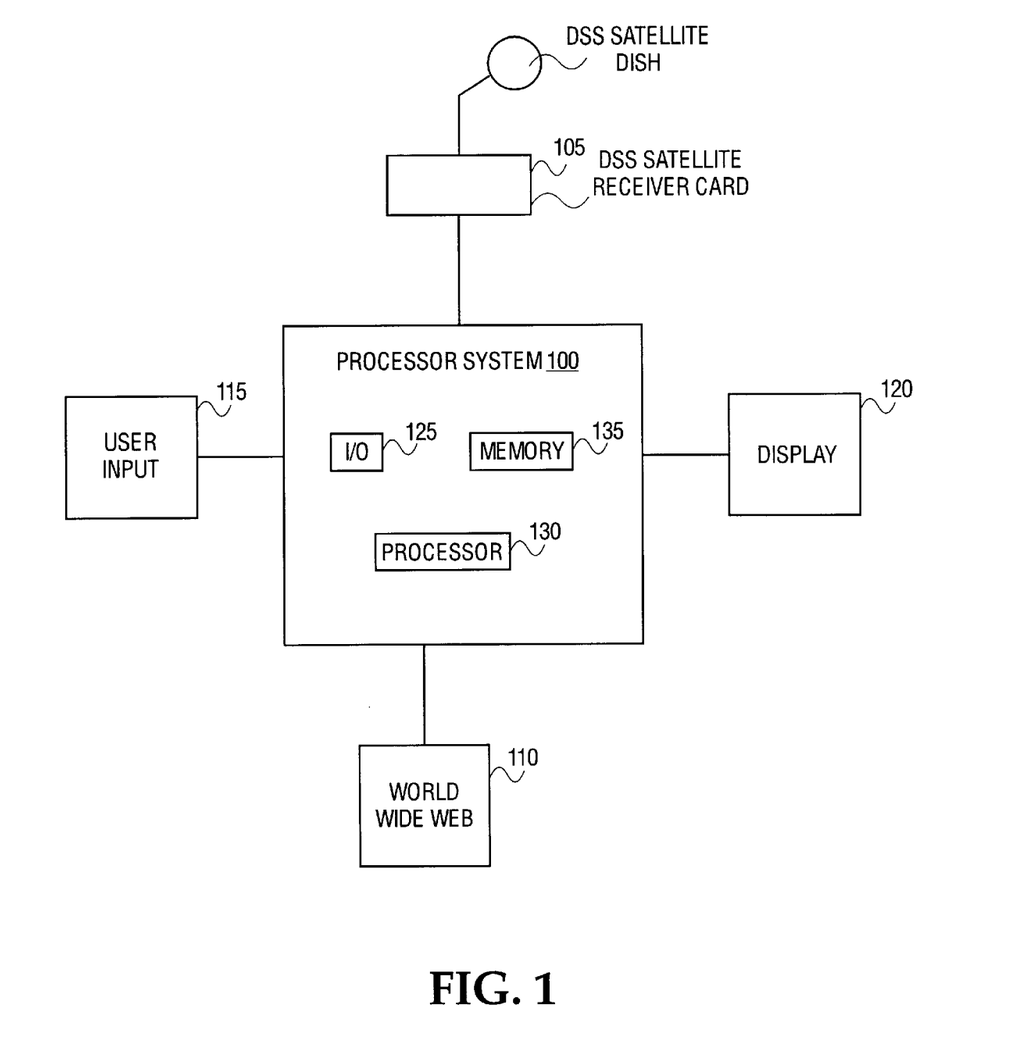
FIG. 1 is a simplified block diagram of one embodiment of the system of the present invention.

One embodiment of the system which incorporates the teachings of the present invention is shown in FIG. 1. A processor system 100 is connected to a variety of information resources, such as a video or broadcast resource 105, for example, such as a standard cable broadcast or satellite transmission, and the World Wide Web 110. Furthermore, a user has at least one input device 115, such as a keyboard mouse or the like, for inputting information to the system 100. A display 120 is also included to display information to the user. The processor system 100 includes input/output circuitry 125, central processing unit (CPU) 130, and memory 135. The system 100 operates to enable the user to specify the information to be displayed in the "user's world" on the display 120. The memory 135 stores information including instructions that are executed by the processor system 100 to perform the processes described below. Alternately, instructions are stored in a storage device (not shown) and retrieved as necessary for execution.

It should be noted that different components can be implemented as instructions that are executed by the processor system 100. Alternately, the different components can be implemented in dedicated logic or hardware or distributed across multiple processors executing instructions or any combination of the above structure. Typically, a processor executes instructions, which in some cases controls hardware, to perform the processes and functions as described herein.

Figure 2:
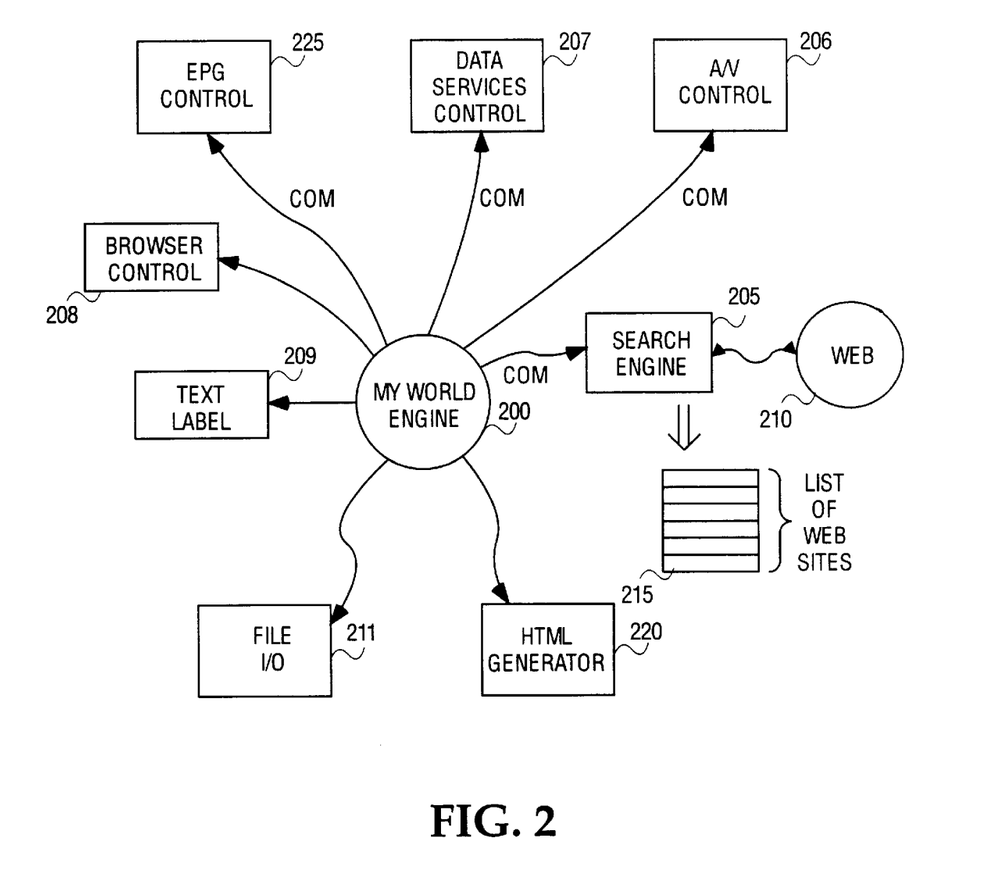
FIG. 2 graphically illustrates one embodiment of the interaction of system components in accordance with the teachings of the present invention.

FIG. 2 is a component level diagram illustrating the different functional components of the system that implement the processes and functions described herein. As noted above, the functions described can be implemented a variety of ways. The functions illustrated include a "My World" engine 200 which interacts with a variety of other components to provide the user the ability to create easy access and subsequently access various resources of interest within the system. This includes EPG control 225, which enables the display of an EPG and control of a broadcast tuner via the EPG, data services control 207, which enables access to a variety of data resources, and audio/video (A/V) control 206, which enables access to a variety of audio and video resources coupled to the system. Furthermore, the "My World" engine 200 may utilize a search engine 205 to perform a specific search on the World Wide Web 210 in order to generate a listing of web sites 215 which satisfy the search criteria. In addition, the engine 200 utilizes an HTML generator 220 to create an HTML document, for example, to display the user's world. Functions such as universal resource locator (or browser) function 208, text label function 209, and file input/output functions 211 may also be provided. FIG. 2 is one example of the functions and resources accessed via the functions; it is readily apparent that the engine 200 may be arranged to interact with a variety of functions in order to access any combination desired information resources that are required by the user. Furthermore, the engine 200 enables the user to create or configure a user's "world" of information resources that span a variety of types of resources. Using the processes described below, the user can easily select resource, e.g. specific web sites, categories of broadcast programming, types of audio resources (e.g. radio stations or audio playback devices), data (e.g. file systems, spreadsheets, etc.) as well as other types of resources in the user's world.

Figure 3:
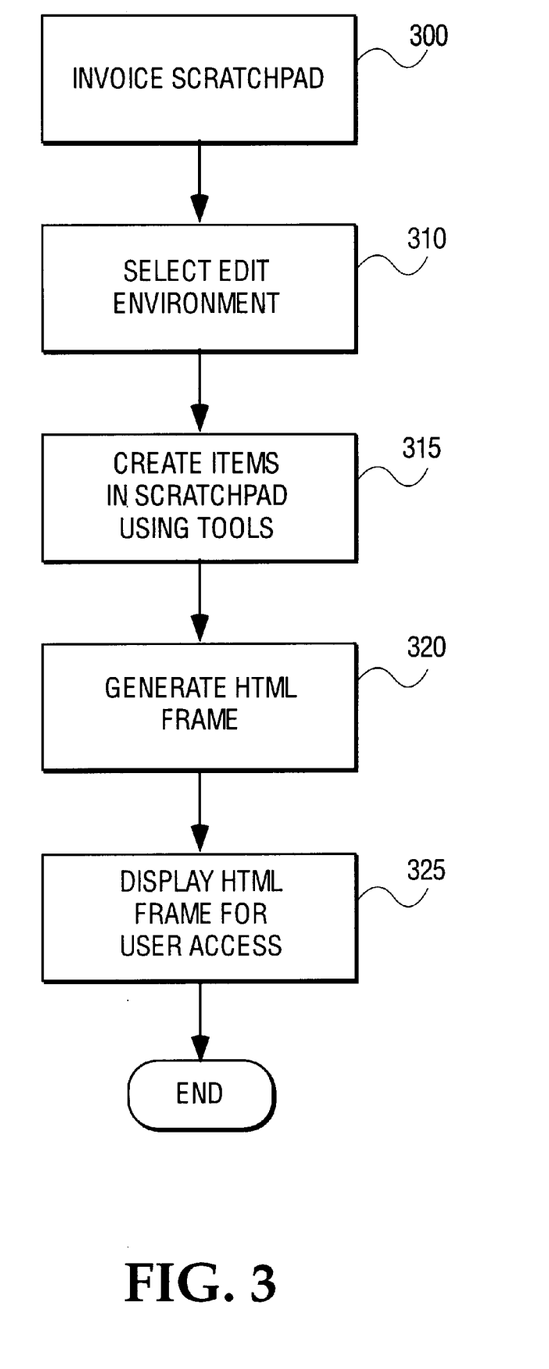
FIG. 3 is a flow diagram generally describing the process used to generate information displays according to user specification in accordance with the teachings of the present invention.

The process for configuring the user's world is generally described with reference to FIG. 3. At step 300 a scratch pad is invoked. A scratch pad is defined as an area on the display to which the user places or drags selected information resources. Several tools are associated with the scratch pad to allow the user to add, change and delete a creation via scratch pad dialog tools. The tools allow free layout and support of the objects, representative of the resources, placed onto the scratch pad. For example, the user can place or drag icons or text reflective of certain web sites to the scratch pad. Ultimately, the user can, for example, place an electronic program guide of broadcasts and/or selected Internet web sites in the scratch pad. As will be described below, once the scratch pad contains the information resources the user desires, the user's world is generated from the information contained in the scratch pad.

At step 310, the operating or edit environment is selected. In the one embodiment, the user currently has access to two environments: the broadcast environment and the Internet environment. However, it is envisioned that other information environments could be utilized in conjunction with the present invention, for example, network databases and audio resources. As will be explained below, the features and options available to the user for creating his world is dependent on the environment selected. The user can first select one environment, and select the items to be placed in his world on the scratch pad. Once the items desired are selected from the particular environment are placed on the scratch pad, the user can then select another environment, and select items from that environment so such that the scratch pad contains items from a variety of information environments. Thus, at step 315, the items are selected and placed on the scratch pad. Once all the items are placed in the scratch pad, the user's world is generated. Preferably, this is achieved by generating an HTML frame, step 320, which then can be displayed using specially configured software or readily available software such as web browsers. The HTML frame is accessed and displayed to generate step 325 on the user's display for the user's world of information resources.

Typically, different users have different requirements as to the information to be displayed on the desktop. For example, for some users it is desirable to display an electronic program guide of all sports broadcasts for the day. For others, it may be desirable to have immediate access to certain web sites as the current stock information (e.g., stock ticker). The interests and needs of the user can change too. Therefore, it is desirable to enable the user to configure the desktop to display and provide immediate access to information identified as of interest by the user. Further, the system provides support for multiple users, as well as multiple worlds for each user. Thus, a user can have multiple worlds for each interest area, for example, a specific world which is business oriented and another which is sports oriented. Additionally, the system can keep track of all active worlds associated with a user in a database, for example, a database stored locally on the user's personal computer (PC). By providing multiple world support, the user can customize the design of different worlds for different needs.

Figure 4:
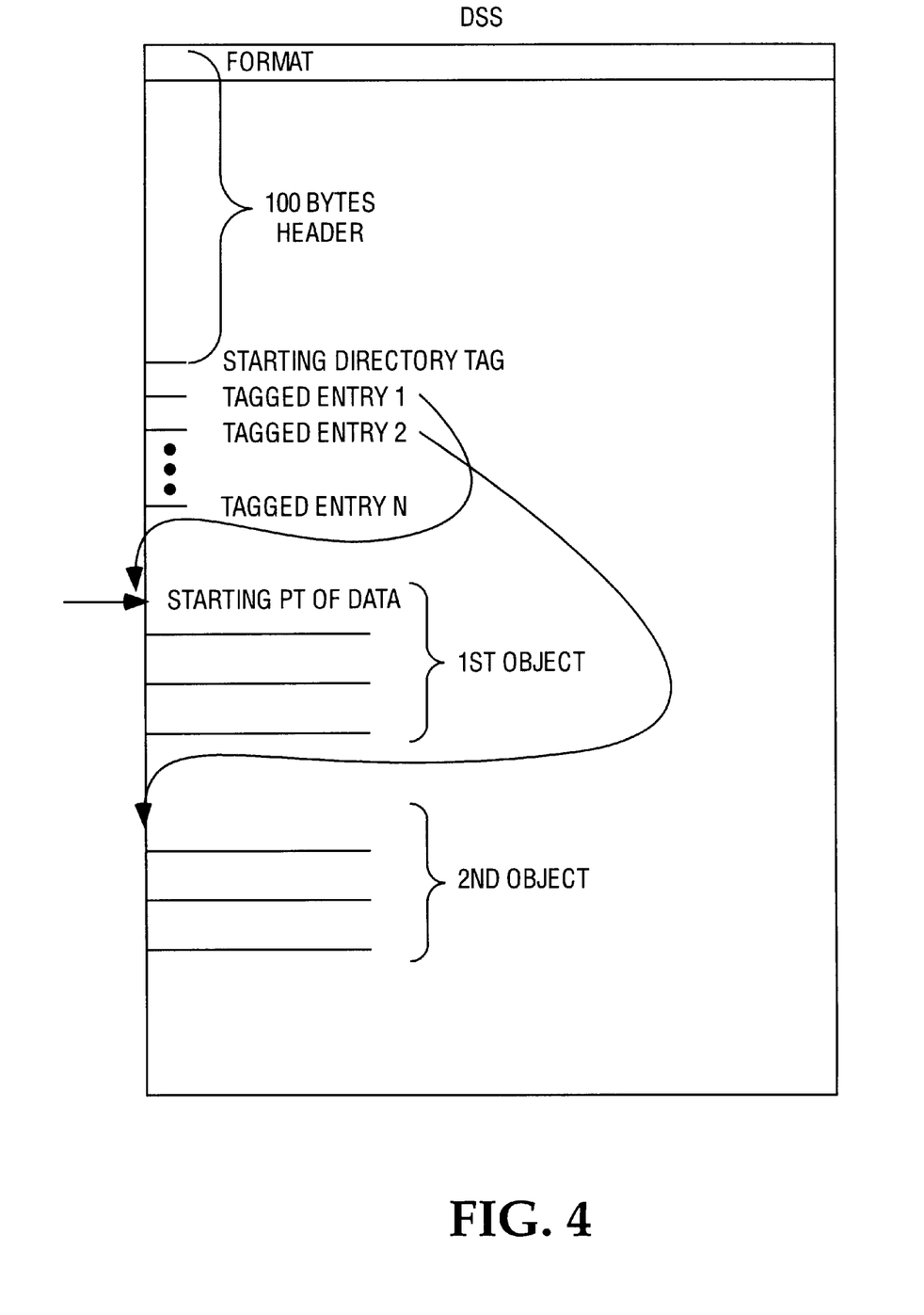
FIG. 4 is an illustration of one embodiment of a data file format of objects contained within the system.

When an object is created, the objects properties/information will be stored into both memory and a data file. FIG. 4 illustrates one data file format of the objects or items which are placed onto the scratch pad. The objects or items placed on the scratch pad are optimally stored in a self-describing format file, wherein the format information of the data is stored as part of the file. Any changes to the properties/information of the objects which are initiated by the user will be reflected both in memory, and upon the selection of a "save" command, those changes will also be recorded in the data file, additionally an "HTML" file containing the new information will be generated. The advantage of this approach is that a variety of processes can read the contents of the file by first reading the format description. Therefore, this format allows the selective retrieval of specific objects from the file without requiring the sequential reading of the file. The self-describing format allows the insertion of related header information. Additionally, checksum information can also be stored in the file which would allow authentication of a file in order to detect an unauthorized modification.

In the file, each object is placed in a separate block or section and has a unique tag to the directory section of the file to facilitate efficient search and retrieval of that specific object. The directory contains a listing of tags for objects and pointers to the corresponding block associated with the tag. In order to retrieve object information, a tag is generated and compared to the tags stored in the directory in order to identify the location in memory to access. For example, if the first object selected is a channel object X, then a tag is generated which corresponds to channel object X, the generated tag is then compared to the tags stored in the directory section of the file. Once a matching tag is found in the directory section which corresponds to the generated tag, for instance "tagged entry 2", a pointer would identify a corresponding block, such as "2nd Object" block, as the information corresponding to channel object X, which would then be retrieved, and so on for each respective object placed onto the scratch pad.

Each of the objects contain different data depending on the objects particular application, for instance, channel objects contain information about channels as it relates to broadcasting. For example, some of the information that a typical channel object would likely contain would be channel number, station identification, audio sub-channel, video sub-channel, second audio program sub-channel, listings of all programs associated with that channel, ratings, closed caption, interface to the electronic program guide (EPG), tuning command interface, interface to audio/video (A/V) control and data services control to support enhanced programming, such as in web pages with live audio and video. If the object is internet related the internet object or web object typically contains URLs (Universal Resource Locator), and text and graphics associated with a specific web site. The URL specifies the location of the site. The internet object provides a direct link to the web site by interfacing through web browser controls provided with the system.

When an object, such as a channel or internet object, is actually being moved or transferred onto the scratch pad, the user will highlight or click (select) the desired object from the information source, drag it onto the scratch pad, and drop or release (deselect) the object onto the scratch pad. Throughout this transfer, the system keeps track of the movement of the object, as well as all messages or events associated with the object. For instance, when an object is selected and moved onto the scratch pad, the kernel will track the coordinates of the object, such as the X, Y location coordinate and/or the window the object is located in, in order to ascertain the location of the object which has just been moved onto the scratch pad.

If an object is a broadcast channel, a C channel object will be instantiated and all coordinates and styles about the broadcast channels will be recorded in memory as properties of the C channel object. Additionally, the system will invoke an electronic program guide (EPG) which adds the selected channel onto the EPG's list of channels which is subsequently displayed. Preferably, the system invokes the EPG using COM (component object model) techniques and passing arguments containing an array of channel numbers and station information. Upon receiving this information from the system, the EPG will update its internal state and information to reflect the new channel object, and additionally the object will be redrawn to reflect the new channel number. The system will also maintain information on the selected channel in memory.

If an object is an Internet (web) object, a C web object will be instantiated, and all the associated coordinates, styles, URL address, and label will be recorded into memory as properties of the C web object in memory.

When a user deselects an object, the object is re-drawn at the location specified by the kernel, in accordance with the location of where the object has been tracked to, and information stored in memory regarding the object is updated accordingly. Therefore, when an object is moved or changed by the user, the new information is used to update the old information in memory by searching for the object selected by the user and modifying the selected object's properties. Upon the user's selection of the "save" command, the information stored in the file is updated and the information previously specified in the HTML file is regenerated to reflect the user's changes. For performance optimization, the information of an object should only be updated upon completion of a task applied on an object. As is readily apparent to one skilled in the art, other options for the transfer of objects from an information source to a operation area/scratch pad can be used.

Figure 5:
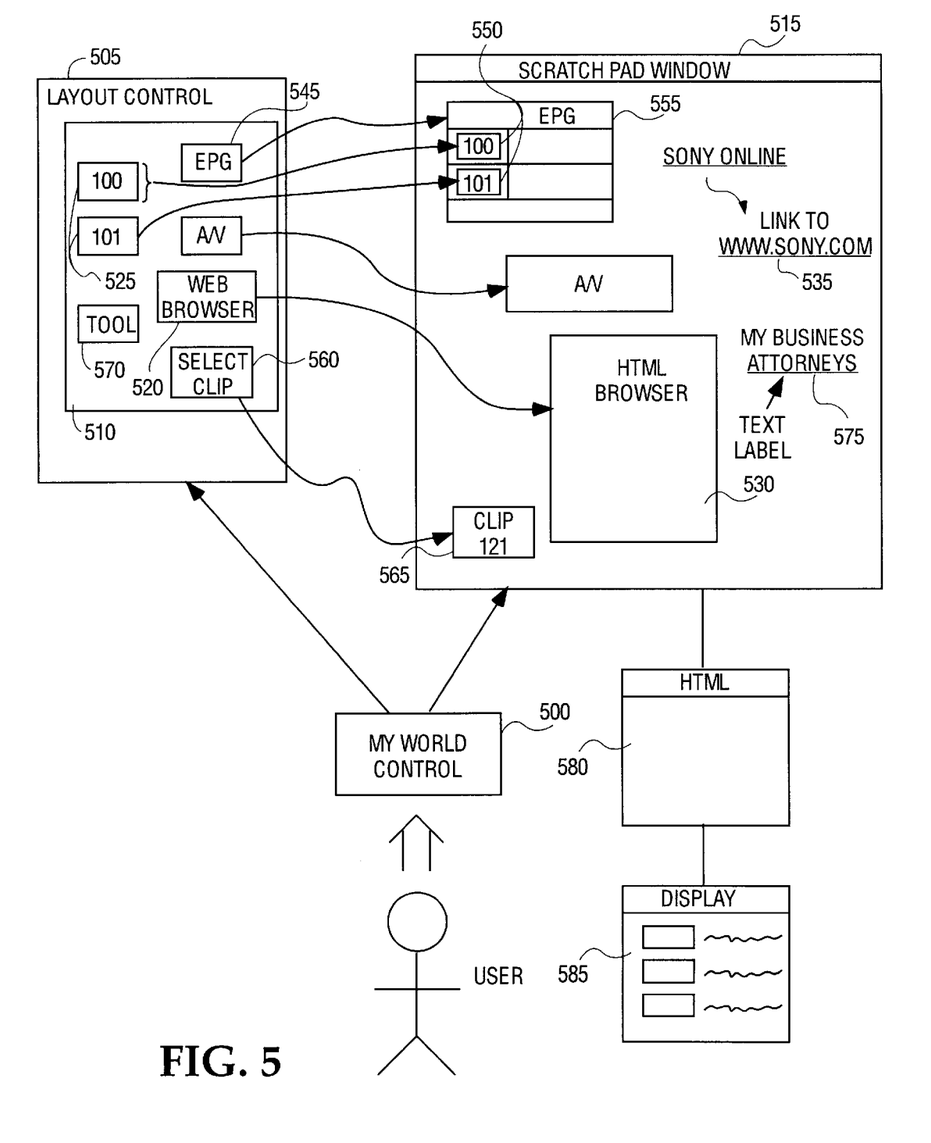
FIG. 5 is a diagram illustrating one embodiment of the interaction of the system with information resources in accordance with the teachings of the present invention.

In the present embodiment, as illustrated in FIG. 5, the engine 500 provides a layout control window 505, also referred to as an information resource control area, and scratch pad window 515. Using the control window 505, which contains different operating environments, such as an internet environment and a broadcast environment, a user can transfer provided information components from the layout control window 510 to a scratch pad area window 515. For example, the operating environments contained within the layout control 505 may provide information to the scratch pad 515 from selected internet resource components 520, such as web browsers and web sites, and selected broadcast source components 525. If a web browser or web site is selected from the internet resources 520, a browser 530 or the respective web site 535 is then displayed on the scratch pad window 515. If the broadcast source 525 is selected, an audio/video window 540 is displayed on the scratch pad window 515, which allows selections from the broadcast source 525 to be viewed. Additionally, the audio/video window 540 displayed on the scratch pad window 515 supports enhanced programming, such as in web pages with live audio and video. Further, the layout control 505 provides an electronic program guide (EPG) selection 545, made up of user selected channels 550 provided by the layout control 505. If selected, an EPG 555 is displayed on the scratch pad window 515 along with the desired channels 550 chosen by the user. Next, the layout control 505 contains a "short cut" selection 560 which provides popular information resources 565, for example, a home page, web browser, or a pay per view menu, onto the scratch pad window 515. Moreover, the layout control area window 510 contains a common tools resource 570 which would allow adjustment of the configuration of the scratch pad window 515, for example, background and foreground colors, and in addition, allow insertion of text/graphics 575 into the scratch pad window 515 to assist in the customization of the user's world.

Once the user has selected the desired information resources and placed the resources into the scratch pad window 515, the create world tool/engine 500 generates a user HTML 580. The HTML 580 is subsequently accessed to enable the generation of a display 585 of the user's world that provides the multimedia information and access to the information.

Figure 6:
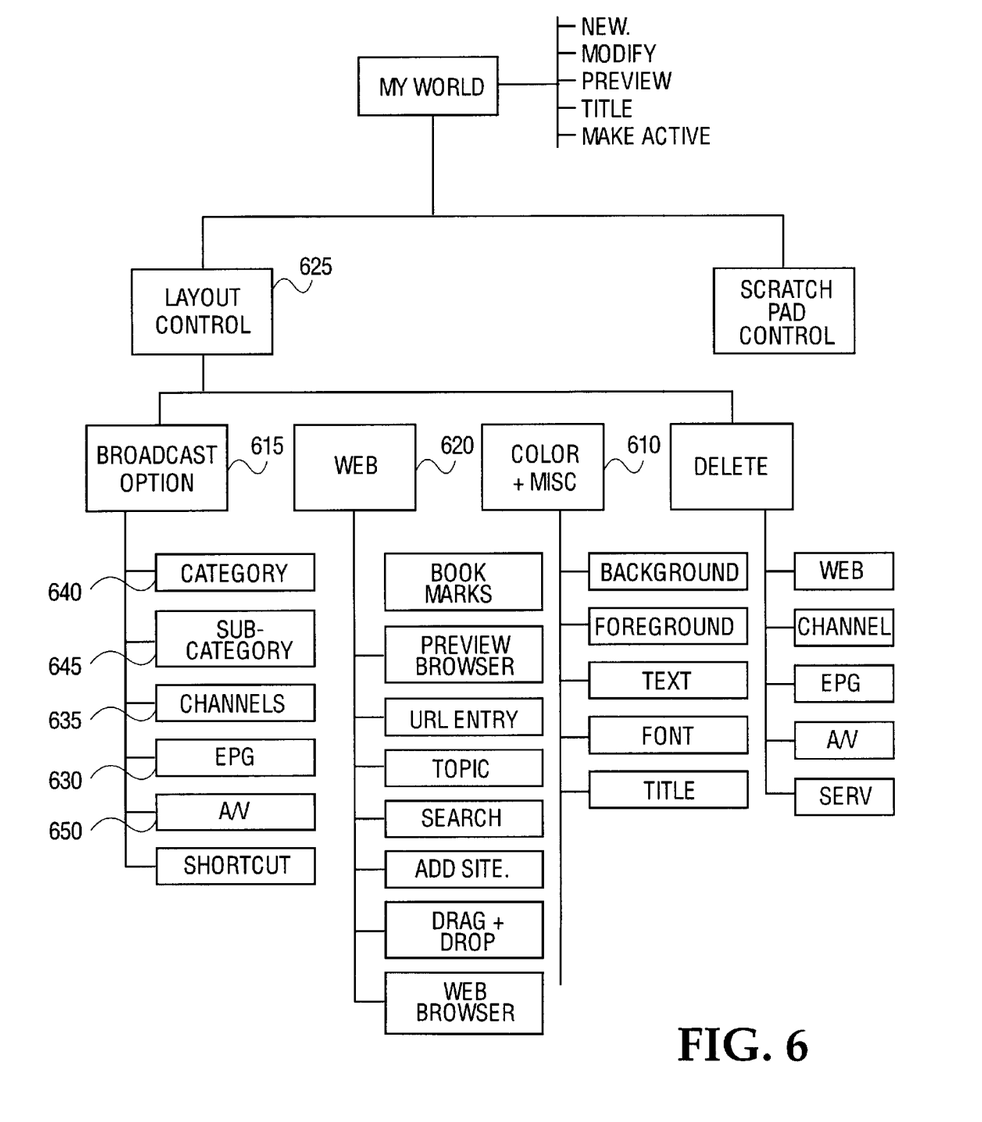
FIG. 6 illustrates one embodiment of the tools available to the user to specify and organize the world of information desired.

FIG. 6 illustrates an overview of the selection of the tools available to the user in creating the user's world 600. Once a scratch pad is generated on a display and is available to the user, the user uses tools such as common tools 610, broadcast selections 615, and web resource selections 620 to configure the scratch pad that is used to create the user's world 600. Additionally, the user can modify parameters of the create world tool 600 by using command modes such as new, modify, preview, title, and make active. The "New" command allows a user to create a new "world", and a blank scratch pad pops up with tools to select web sites and channels. The "Modify" command allows a user to make changes to an existing world, and a scratch pad containing the selected world pops up ready for the user's modification. Next, the "Preview" command allows a user to preview an existing world. The "Title" command provides a title which is associated with each world. Finally, the "Make Active" command allows the users the option of making a newly designed scratch pad as the default desktop that will be displayed when the user starts the application again.

Next, as further illustrated in FIG. 6, the user can enter into an edit/operating environment wherein the user may select from a series of tools contained within the layout control area 625 in order to configure the current creation or world. In particular, in the present environment, the user can select or deselect channels or web sites to be provided to the scratch pad to eventually create the user's world. Although the present embodiment describes the Internet 620 and broadcast channels 615 as the two information environments available, it is readily apparent that the system can be expanded to include other information environments. Further, a common tools environment 610 is included to allow insertion of text/graphics into the scratch pad, as well as for manipulating the characteristics of the scratch pad and objects placed onto the scratch pad.

Figure 7A:
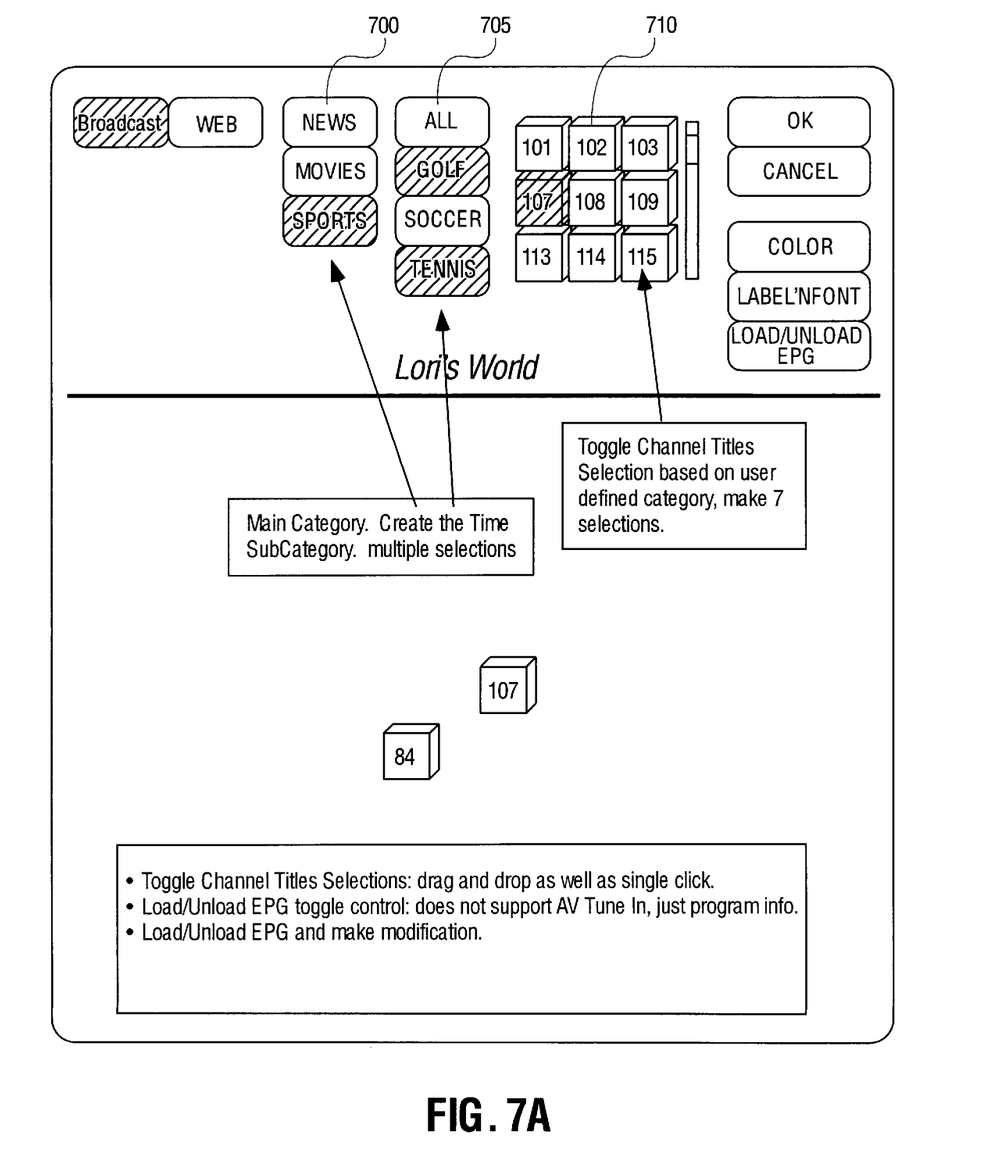
FIGS. 7a and 7b illustrate one embodiment of the tools and use of the tools to select channels.
Figure 7B:
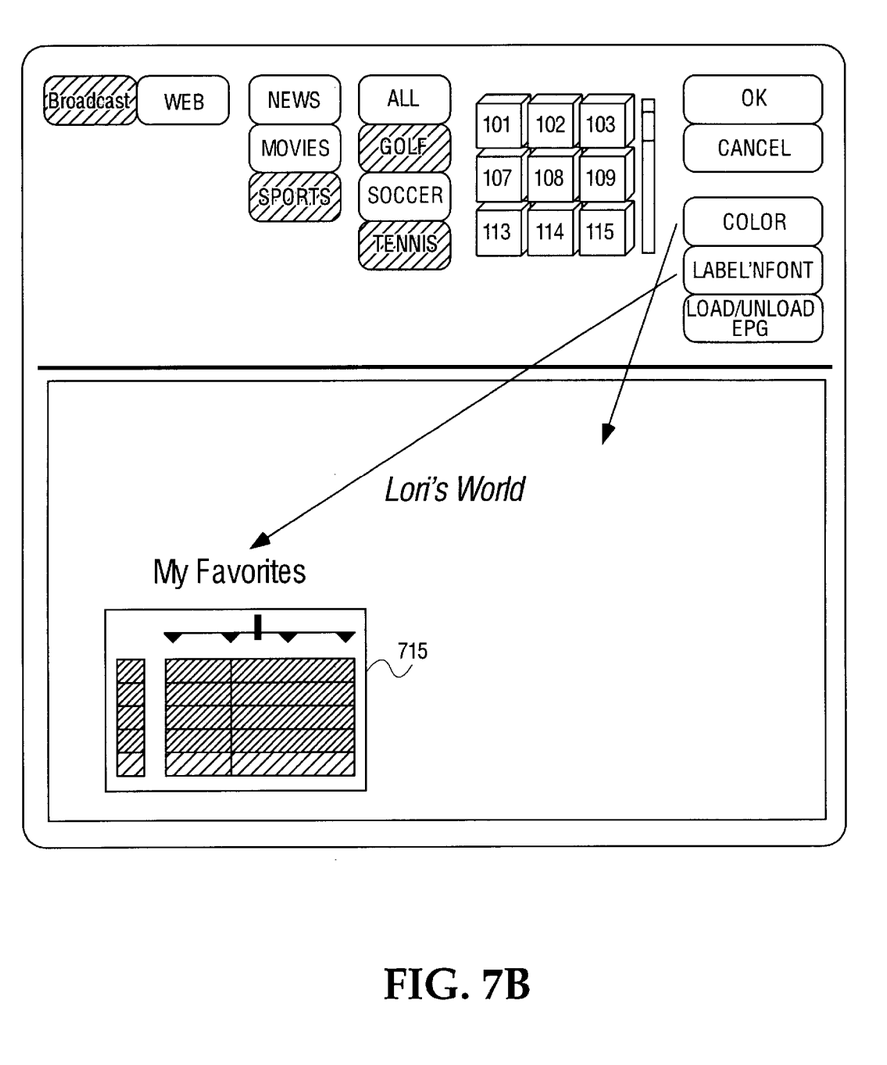
Figure 7C:
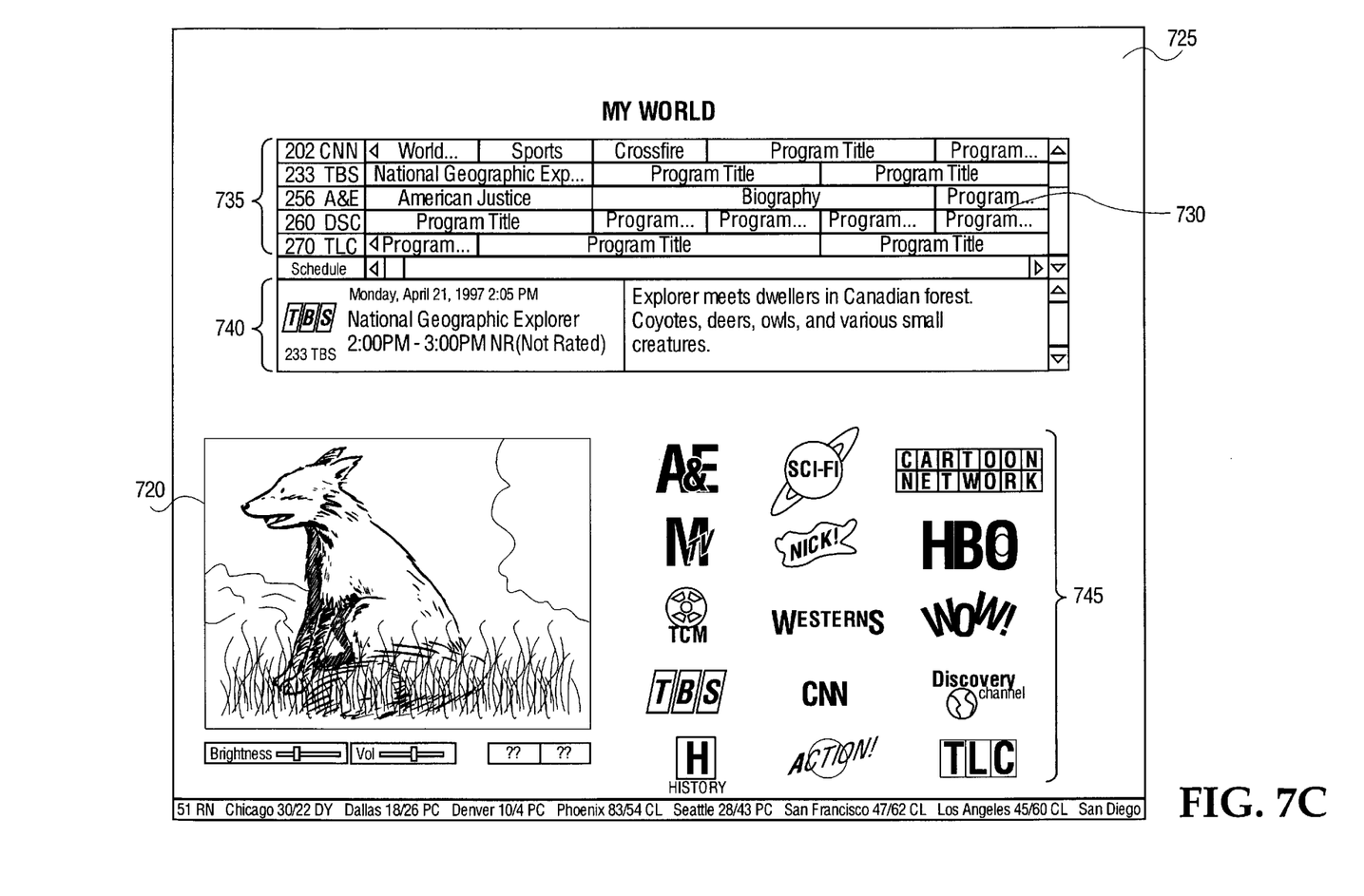
FIG. 7c illustrates one embodiment of an audio/video display for use with broadcast channel selections.

Specifically, as illustrated in FIG. 6, if the broadcast environment 615 is selected, the user can specify a personalized electronic program guide (EPG) 630. The user can place specific station identifications 635 into the layout area of the EPG. Category 640 and sub-category 645 filters can be selected to identify the stations for which the EPG provides information. Thus, it is shown that filters, 640 and 645, can be applied and the selections placed in the scratch pad area via the EPG. Further, the user can select an audio/video (A/V) selection 650 and visually display corresponding selected station identifications 635. This is illustrated in FIGS. 7*a*, 7*b* and 7*c*. FIG. 7*a* shows one embodiment of the channel selection tools. Movie categories 700 can be selected and sub-categories may be displayed 705. The station identifications (ID) 710 of those stations having programming in those selected categories and/or sub-categories are displayed. A station can then be selected such that when the EPG is subsequently placed on the scratch pad, as shown in FIG. 7*b*, the EPG 715 will include listings for those selected channels. It is contemplated that once the EPG 715 has been loaded to the scratch pad, the EPG 715 can be subsequently unloaded to enable the channel selections to be edited. FIG. 7*c* illustrates one embodiment of an audio/video (A/V) display window 720, displayed in one embodiment of the user's world. An EPG 730 contains selected station identifications and corresponding programming for those stations 735. A currently active station identification 740 displayed reflects the station and program of the A/V image presented in the A/V display window 720. As illustrated, the currently active station identification 740, can further include an identification and brief text synopsis of the currently displayed program. It should be noted that selected station identifications 745 can also be represented as icons independent of the EPG 730.

Figure 8A:
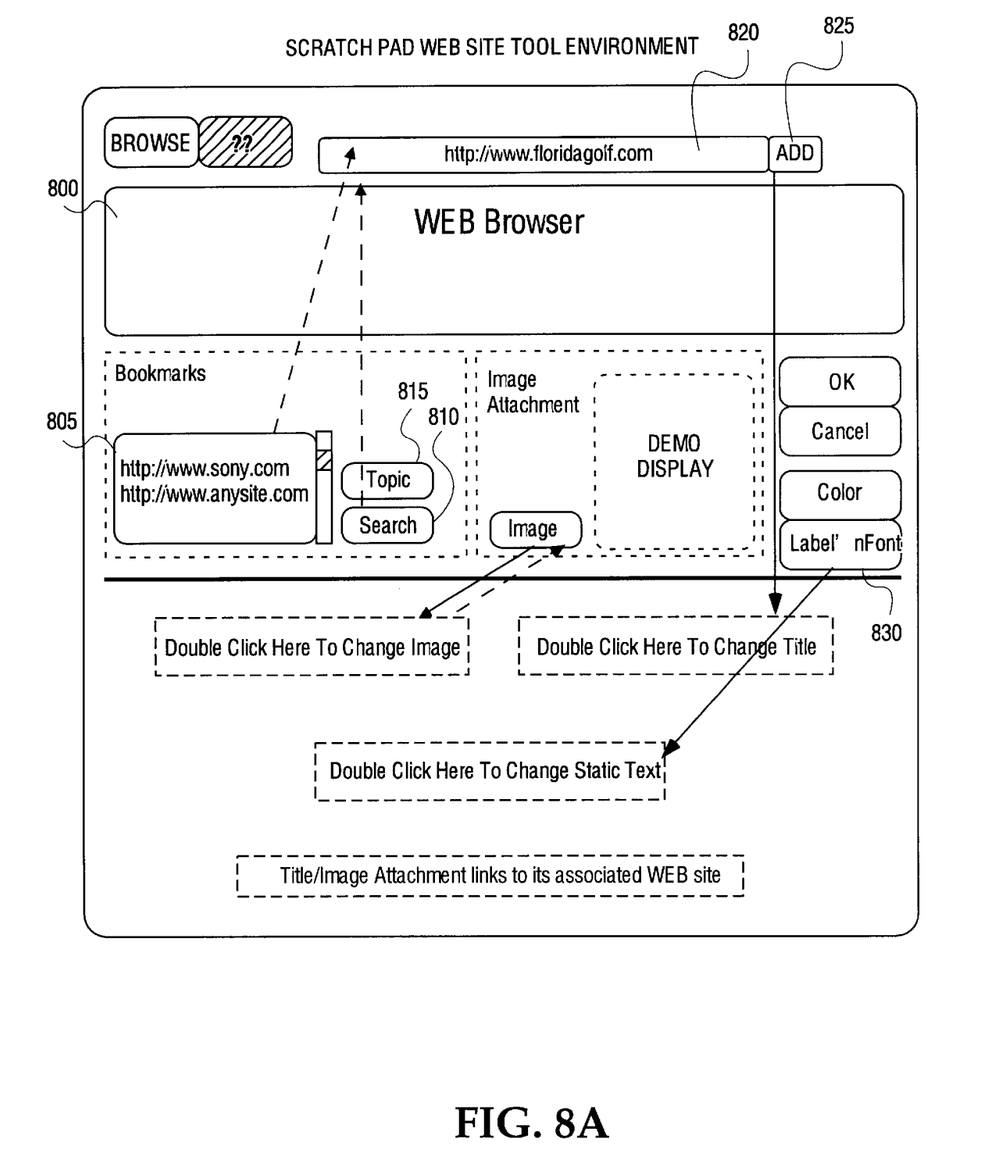
FIGS. 8a and 8b illustrate one embodiment of the tools and use of the tools to select web sites.

Returning again to FIG. 6, if the internet environment 620 is selected, various tools can be used to identify web sites, bookmarks, browsers, and searches. Sites can then be added to the scratch pad by a title or by some kind of graphic, such as a GIF file. FIG. 8*a* illustrates the graphical interface of tools which can be used to select web sites to be placed on the scratch pad. In particular, the web browser 800 can be used to identify web sites. Bookmarks 805 can also be used. Searches can also be used to search for web sites. Using the search engine 510 the user can enter a topic, select topic control 815, to perform a search for related sites. Once the system is connected to a web site, it is displayed via the desktop browser 800. The URL information is available in area 820. Using the add control 825, the user can add the web site to the scratch pad. The user can indicate whether the title or an image is to be associated with the site displayed in the user's world. A selected site is treated as an object on the scratch pad. The user can select a site object to change the site or the title or image. The delete key can be used to remove the web site.

The scratch pad allows the user to associate an image to a particular site. The control GIF display permits the user to view the associate GIF file. The label font key 830 permits the user to specify the font characteristics of text objects through which text strings can be entered and displayed.

Figure 8B:
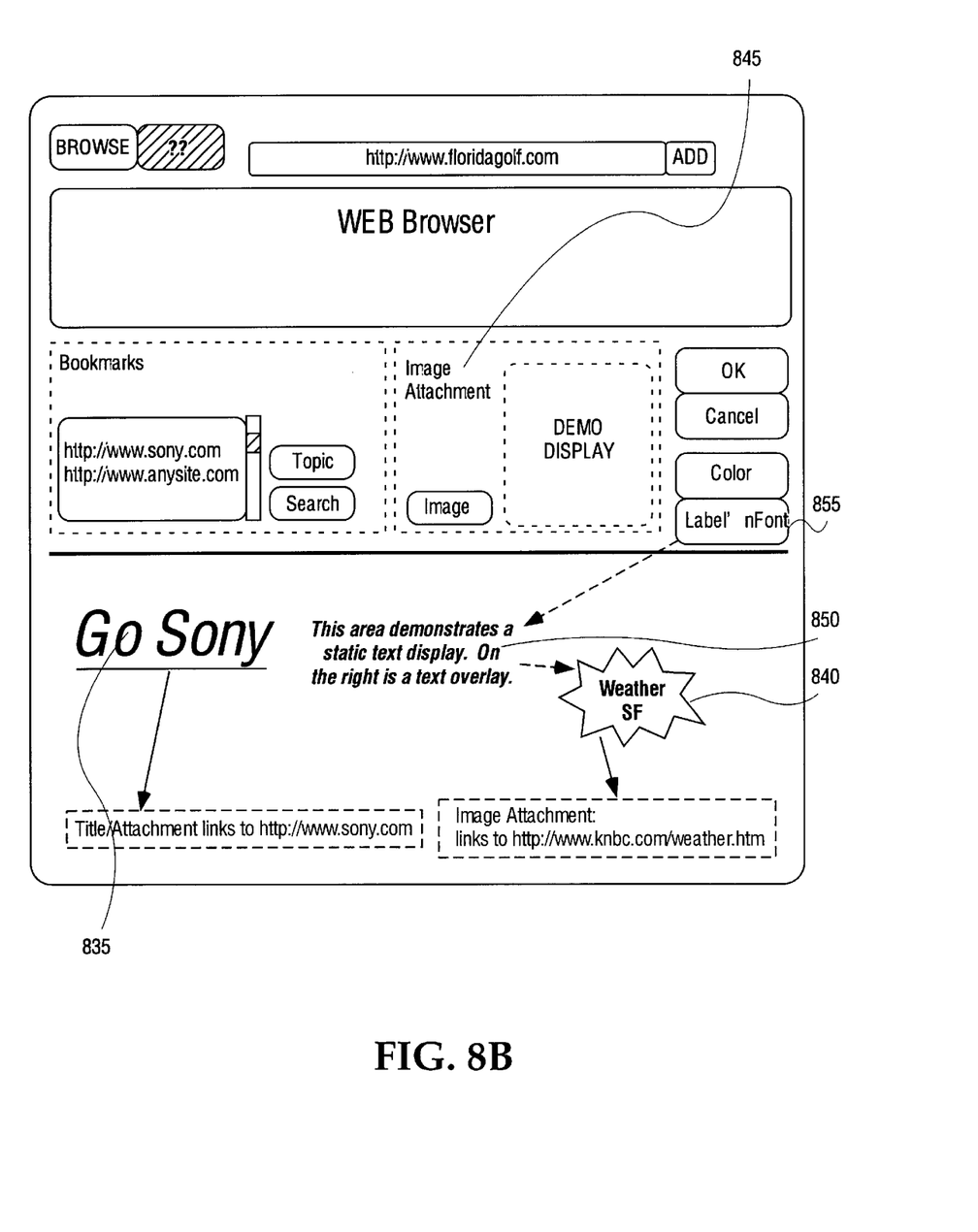

FIG. 8*b* illustrates web site links placed on the scratch pad. For example, the object 835 links to the web site HTTP//www.sony.com. Similarly, the object 840, which when activated links to the web site HTTP/ /www.knbc/weather/HTML, has an image attached by using a imaging tool 845. The object 850 is simply text that was generated using a label and font tool 855.

Once the world is created by the user, then the world can be rendered onto the display. In the present embodiment, the user has options as to how the world can be rendered onto the display. For instance, a full screen representation of the rendered world can be displayed, or a partial display which is embedded in the current work space can be displayed, depending upon the user's preference. As is readily apparent to one skilled in the art, other options for display of the user's world can be used.

In the present embodiment, the user's world is represented by an HTML frame. However, it is readily apparent that the user's world may be rendered in a variety of formats. One advantage to using an HTML frame is that the user's web browser can be used not only to view his world, but the web sites that are part of the user's world.

The process for translating the scratch pad into an HTML document will now be explained with reference to FIG. 9. When a user selects a "save" command, the system saves the object data information from memory to file, while simultaneously invoking an "HTML-generator" engine to parse the object data in memory, obtaining each object's coordinates and representation. Information provided for each object is then converted into an HTML representation in order to generate an HTML representation of each of the selected objects into an HTML file. The information stored in memory is stored in an object list structure with next and previous pointers associated with each object. As the HTML generator finds each object on the object list, the HTML generator writes all information about each found object into an HTML file. A variety of information may be provided to the HTML generator. Typical information utilized by the HTML generator includes coordinates of the object, class and style of the object, universal object ID (if applicable) background, font, color, etc. The newly generated HTML file contains HTML representations of user selected objects wherein, as illustrated in FIG. 9, the HTML representations of each object contain an object reference to the user selected objects in memory. When a web browser reads the HTML file, the web browser uses the information contained within the HTML file to recreate the selected objects to generate the user's world.

For example, as shown in FIG. 9, if the user initially saves an EPG/channel object, the HTML generator would generate an HTML representation of the EPG/channel object, for example as an EPG/channel object 900. The EPG/channel object 900 also contains a reference to the selected EPG/channels (shown as "ID=Epg1") along with any other required information that is associated with the EPG/channel object. If the user initially saves an internet object, the HTML generator would generate an HTML representation of the internet object, for example internet object 905. The internet object 905 contains the reference to the selected internet object (shown as "HREF=http://www.cyberdiet.com") along with any other required information that is associated with the internet object. As illustrated by FIG. 9, the user could save multiple objects which would be processed by the HTML generator into HTML representations of the saved objects in the HTML file. Therefore, as a web browser accesses the HTML file, the web browser uses the HTML representations of each object contained within the HTML file to recreate the selected objects.

The invention has been described in conjunction with the preferred embodiment. It is evident that numerous alternatives, modification, variations, and uses will be apparent to those skilled in the art in light of the foregoing description.

What is claimed is:

1. A user configurable method for generating a display of components, said method comprising the steps of:

invoking an information resource control area on a display comprising a display of at least one operating environment of information resources;

invoking a scratch pad area on a display;
selecting at least one operating environment from said information resource control area;
selecting components from said at least one operating environment;
placing said selected components in said scratch pad at user specified locations in the scratch pad area; and
generating a user interactive HTML frame from the components located in said scratch pad area comprising generating a user display area comprising a display of said selected components at said user specified locations, wherein said user interactive HTML frame containing said components is capable of being stored for subsequent access.

2. The method as set forth in claim 1, wherein said at least one operating environment comprises a broadcast environment and the components comprise broadcast stations.

3. The method as set forth in claim 2, wherein the step of generating a user display area comprises generating an electronic program guide of selected broadcast stations.

4. The method as set forth in claim 2, wherein the step of selecting said components from said broadcast environment comprises generating an electronic program guide comprising selected broadcast stations.

5. The method as set forth in claim 1, wherein said at least one operating environment comprises an Internet environment and the components comprise internet resources.

6. The method as set forth in claim 5, wherein said step of selecting said components from said Internet environment comprises:
obtaining universal resource locators (URL) for web sites; and
selecting desired web site URL's to be transferred into said scratch pad.

7. The method as set forth in claim 6, wherein each web site is selectively associated with a displayed image and a title.

8. The method as set forth in claim 1, wherein the step of placing said selected components into said scratch pad comprises:
dragging said selected components from said at least one environment; and
dropping said selected components from said at least one operating environment into said scratch pad.

9. The method as set forth in claim 1, wherein the step of generating a user display comprises generating an HTML frame from said selected components placed in said scratch pad.

10. The method as set forth in claim 1, wherein at least one component is a user interactive component further comprising the step of invoking a component once the step of generating a user display area is performed.

11. The method as set forth in claim 10, wherein the step of invoking a component comprises the steps of a user selecting a component from the display area and providing information resources corresponding to the component selected from the display area.

12. The method as set forth in claim 11, wherein a component comprises broadcast stations and the step of providing information resources comprises displaying information regarding programming on the broadcast station.

13. The method as set forth in claim 11, wherein a component comprises a broadcast station and the step of providing information resources comprises displaying in an audio/video window a program of the broadcast station.

14. The method as set forth in claim 11, wherein a component comprises an internet resource, said step of providing information resources comprising the step of displaying the internet resource.

15. The method as set forth in claim 14, wherein the internet resource comprises a web site.

16. In a system comprising a processor, memory, input/output circuitry, a display, and at least one input device, a user configurable display construction tool comprising:
a scratch pad window located on the display;
a information resource display window located on the display, said information resource display window comprising a display of at least one operating environment of informational resources, said information resource display containing at least one component, each component corresponding to at least one information resource wherein selected components from said information resources contained in information resource window are transferred to user specified locations within said scratch pad window; and
said processor generating a user interactive HTML frame of said components transferred to said scratch pad window comprising a user display area comprising a display of said selected components at said user specified location, wherein said user interactive HTML frame containing said components is capable of being stored for subsequent access.

17. The system as set forth in claim 16, wherein said at least one information resource comprises a broadcast environment and the components comprise broadcast stations.

18. The system as set forth in claim 17, wherein said processor generates an electronic program guide of selected broadcast stations.

19. The system as set forth in claim 16, wherein said processor generates an audio/video window which displays a broadcast of a program of a broadcast station.

20. The system as set forth in claim 16, wherein said at least one information resource comprises an Internet environment and the components comprise internet resources.

21. The system as set forth in claim 16, wherein said processor generates a user interface display by generating an HTML frame.

22. A computer readable medium containing executable instructions which, when executed in a processing system, causes the system to perform the steps for creating a user configurable interactive display comprising:
invoking an information resource control area on a display comprising a display of at least one operating environment of information resources;
invoking a scratch pad area on a display;
selecting at least one operating environment from said information resource control area;
selecting components from said at least one operating environment;
placing said selected components in said scratch pad at user specified locations; and
generating a user interactive HTML frame from the components located in said scratch pad area, comprising generating a user display area comprising a display of said selected components at said user specified location, wherein said user interactive HTML frame containing said components is capable of being stored for subsequent access.

23. The computer readable medium as set forth in claim 22, wherein said step of generating said user display area comprises:
generating a user display area comprising a display of said selected components at said user specified locations.

* * * * *